United States Patent
Kabe et al.

(10) Patent No.: US 8,657,720 B2
(45) Date of Patent: Feb. 25, 2014

(54) SHIFT CONTROL APPARATUS FOR CONTINUOUSLY VARIABLE TRANSMISSION

(71) Applicant: Jatco LTD, Fuji (JP)

(72) Inventors: Tomoaki Kabe, Nagoya (JP); Nobuhiko Morifuji, Okazaki (JP); Keisuke Ichikawa, Nagoya (JP); Nobuhide Kato, Kariya (JP); Yuki Ono, Okazaki (JP); Hiromu Ogino, Yamato (JP); Yukinobu Sakakibara, Gamagori (JP); Hisao Nakanishi, Ichinomiya (JP); Takahiro Nakata, Mishima (JP); Mitsuki Ishizuka, Isehara (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 13/712,259

(22) Filed: Dec. 12, 2012

(65) Prior Publication Data

US 2013/0165295 A1 Jun. 27, 2013

(30) Foreign Application Priority Data

Dec. 26, 2011 (JP) ................................ 2011-282702

(51) Int. Cl.
*F16H 61/662* (2006.01)
(52) U.S. Cl.
USPC .................... 477/43; 477/44; 477/46; 701/55; 701/56; 701/62
(58) Field of Classification Search
USPC ................. 477/37, 43, 44, 46; 701/55, 56, 62
See application file for complete search history.

(56) References Cited

U.S. PATENT DOCUMENTS

| 4,976,170 A | 12/1990 | Hayashi et al. |
| 5,611,748 A | 3/1997 | Kashiwabara |
| 6,436,003 B1 | 8/2002 | Kleila et al. |
| 2003/0162633 A1* | 8/2003 | Nakayama et al. ........... 477/120 |
| 2005/0107935 A1 | 5/2005 | Herbster et al. |

(Continued)

FOREIGN PATENT DOCUMENTS

| EP | 1 164 315 A2 | 12/2001 |
| EP | 2 175 172 A1 | 4/2010 |
| JP | 2001-099290 A | 4/2001 |
| JP | 2005-164000 A | 6/2005 |

OTHER PUBLICATIONS

U.S. Appl. No. 13/712,271, filed Dec. 12, 2012, Kabe et al.

(Continued)

*Primary Examiner* — Derek D Knight
(74) *Attorney, Agent, or Firm* — Foley & Lardner LLP

(57) ABSTRACT

A shift control apparatus for a continuously variable transmission includes: a target transmission gear ratio setting section configured to set a target transmission gear ratio with reference to a map based on an accelerator opening degree and a vehicle speed; a shift control section configured to control a shift of the continuously variable transmission based on the target transmission gear ratio; and a downshift restricting section configured to judge whether or not a restriction of the downshift is needed based on at least one of a variation amount of the accelerator opening degree and an accelerator depression speed, and to perform the restriction of the downshift when the downshift restricting section judges that the restriction of the downshift is needed, irrespective of a variation of the accelerator opening degree inputted to the target transmission gear ratio setting section.

5 Claims, 8 Drawing Sheets

(56) References Cited

U.S. PATENT DOCUMENTS

| | | | |
|---|---|---|---|
| 2009/0319137 A1* | 12/2009 | Miyanoo | 701/54 |
| 2010/0191429 A1 | 7/2010 | Kuwahara et al. | |
| 2013/0138309 A1* | 5/2013 | Kabe et al. | 701/58 |
| 2013/0165296 A1* | 6/2013 | Kabe et al. | 477/37 |

OTHER PUBLICATIONS

T. Kabe, U.S. PTO Notice of Allowance, U.S. Appl. No. 13/712,271, dated Aug. 14, 2013, 14 pages.

* cited by examiner

SHIFT CONTROL APPARATUS FOR CONTINUOUSLY VARIABLE TRANSMISSION

BACKGROUND OF THE INVENTION

This invention relates to a shift control apparatus for a continuously variable transmission.

In a continuously variable transmission for a vehicle, there are a belt type continuously variable transmission, a troidal continuously variable transmission, and so on. A speed ratio of any of the transmissions is controlled in accordance with a running state of the vehicle.

For example, the belt type continuously variable transmission includes a primary pulley, a secondary pulley, and a belt wound around the primary pulley and the secondary pulley. The belt type continuously variable transmission transmits a rotational driving force (torque) inputted to the primary pulley, through the belt to the secondary pulley while a transmission gear ratio is continuously varied by varying radii of the primary and secondary pulleys around which the belt is wound.

A shift control apparatus of the continuously variable transmission includes a shift diagram set based on simulations, tests and so on, and performs a shift control based on a shift line defined in this shift diagram.

For example, in the case of the belt type continuously variable transmission, a target rotational speed of the primary pulley is set from the shift diagram based on the accelerator opening degree and the vehicle speed. A target transmission gear ratio (pulley ratio) is set from this set target rotational speed. The shift control apparatus controls the primary pulley and the secondary pulley so that groove widths of the primary pulley and the secondary pulley become groove widths to attain the set transmission gear ratio.

A Japanese Patent Application Publication No. 2005-164000 discloses a shift control apparatus for a continuously variable transmission which is configured to judge whether or not the driver has an acceleration intention based on an accelerator operation of the driver, to switch from a normal shift line to a shift line for the acceleration when it is judged that the driver has the acceleration intention, and to set the target transmission gear ratio based on the transmission line for the acceleration.

SUMMARY OF THE INVENTION

In the shift control apparatus for the continuously variable transmission, the shift line used for the shift control is switched in accordance with the accelerator opening degree. When the target transmission gear ratio is set based on the shift line after the switching by the variation of the accelerator opening degree, the shift (a downshift or an upshift) for attaining the set target transmission gear ratio is performed.

In an automatic transmission which is a stepwise automatic transmission (stepped AT) that is not the continuously variable transmission, if an accelerator operation which moves across the shift line is not performed, the shift (the downshift or the upshift) is not performed.

On the other hand, in the case of the continuously variable transmission, even when a minute accelerator operation is performed, the target transmission gear ratio is set from the shift line switched in accordance with the accelerator opening degree after the operation, and the shift is rapidly performed. Accordingly, the continuously variable transmission can rapidly attain an appropriate transmission gear ratio according to the acceleration operation. Consequently, the continuously variable transmission is superior in the power performance (engine performance) and the fuel economy performance.

However, when the downshift is linearly performed with respect to the accelerator operation of the driver and the engine speed is increased, the driver feels the slippage feeling with respect to the shift behavior of the continuously variable transmission, and gets a feeling that the increase of the engine speed is noisy. The driver may feel the unnatural feeling to the driving feeling.

In particular, the unnatural feeling to the driving feeling tends to be increased when the downshift is performed linearly with respect to the accelerator operation in the middle that the vehicle is accelerated by the depression of the accelerator pedal.

It is, therefore, an object of the present invention to provide a shift control apparatus for a continuously variable transmission which is devised to improve an unnatural feeling of a driver with respect to a driving feeling.

According to one aspect of the present invention, a shift control apparatus for a continuously variable transmission of a vehicle which is arranged to continuously vary a rotational driving force of an engine which is inputted to an input side rotation member, and to transmit the varied rotational driving force to an output side rotation member, the shift control apparatus comprises: a target transmission gear ratio setting section configured to set a target transmission gear ratio with reference to a map based on an accelerator opening degree and a vehicle speed; a shift control section configured to control a shift of the continuously variable transmission based on the target transmission gear ratio; and a downshift restricting section configured to judge whether or not a restriction of the downshift is needed based on at least one of a variation amount of the accelerator opening degree and an accelerator depression speed, and to perform the restriction of the downshift when the downshift restricting section judges that the restriction of the downshift is needed, irrespective of a variation of the accelerator opening degree inputted to the target transmission gear ratio setting section.

DETAILED DESCRIPTION OF THE INVENTION

Figure 1:
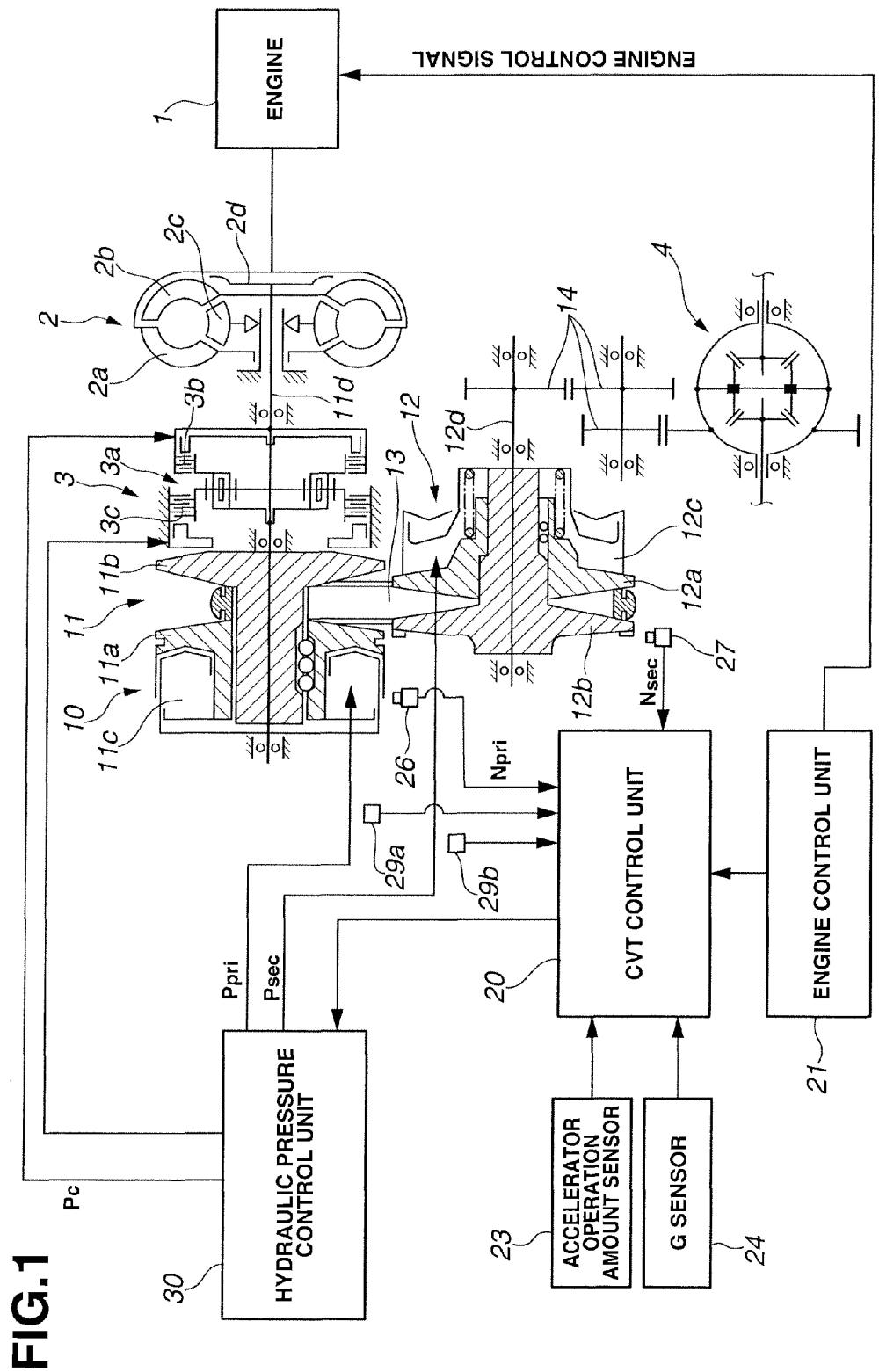
FIG. 1 is a schematic configuration view showing a belt type continuously variable transmission for a vehicle according to one embodiment of the present invention.

Hereinafter, a belt type continuously variable transmission according to one embodiment of the present invention will be illustrated.

Belt-type continuously variable transmission 10 includes a primary pulley 11, a secondary pulley 12, a V belt 13, a CVT control unit 20, and a hydraulic pressure control unit 30.

Primary pulley 11 is disposed coaxially with an engine 1. A torque converter 2 and a forward-reverse switching mechanism 3 are disposed in this order from an engine 1's side, between an engine 1 and primary pulley 11.

Torque converter 2 includes a pump impeller 2a connected with an output shaft of engine 1, a turbine runner 2b connected with an input shaft of forward-reverse switching mechanism 3, a stator 2c, and a lockup clutch 2d.

Forward-reverse switching mechanism 3 includes, as a main component, a double pinion planetary gear set 3a. This double pinion planetary gear set 3a includes a sun gear connected with turbine runner 2b of torque converter 2, and a carrier connected with primary pulley 11. Forward-reverse switching mechanism 3 further includes a start clutch 3b directly connecting between the sun gear and the carrier of double pinion planetary gear set 3a, and a reverse brake 3c arranged to fix a ring gear. When start clutch 3b is engaged, an input rotation from engine 1 through torque converter 2 is directly transmitted to primary pulley 11. When reverse brake 3c is engaged, the input rotation from engine 1 through torque converter 2 is reversed, and this reversed rotation is transmitted to primary pulley 11.

Primary pulley 11 is a pulley which is on an input shaft side, and which inputs the rotation of engine 1 to belt type continuously variable transmission 10. Primary pulley 11 includes a fixed conical disc (plate) arranged to rotate as a unit with an input shaft 11d, and a movable conical disc (plate) which is disposed to confront this fixed conical disc 11b to form a V-shaped pulley groove, and which is arranged to be moved in an axial direction by a hydraulic pressure (primary pressure Ppri) acted to a primary pulley cylinder chamber 11c. Primary pulley 11 receives a rotation driving force of engine 1 through forward-reverse switching mechanism 3 and torque converter 2. A rotational speed of primary pulley 11 is sensed by a primary pulley rotational speed sensor 26.

A secondary pulley 12 includes a fixed conical disc (plate) 12b arranged to rotate as a unit with an output shaft 12d, and which is disposed to confront this fixed conical disc 12b to form a V-shaped pulley groove, and which is arranged to be moved in an axial direction by a hydraulic pressure (secondary pressure Psec) acted to a secondary pulley cylinder chamber 12c.

Secondary pulley 12 is connected through an idler gear 14 and an idler shaft to a differential (gear) 4. Secondary pulley 12 outputs an rotation transmitted by V belt 13 to differential 4.

A rotational speed of secondary pulley 12 is sensed by a secondary pulley rotational speed sensor 27.

V belt 13 is wound around primary pulley 11 and secondary pulley 12. V belt 13 transmits the rotation of primary pulley 11 to secondary pulley 12.

CVT control unit 20 determines a target pulley ratio and a contact frictional force of V belt 13. CVT control unit 20 outputs a command to hydraulic pressure unit 30, and controls continuously variable transmission 10. In this case, a pulley ratio is obtained by dividing an effective radius of secondary pulley 12 by an effective radius of primary pulley 11. The pulley ratio has the same meaning of the transmission gear ratio.

Moreover, CVT control unit 20 outputs a command to hydraulic pressure control unit 30 so as to control engagements and disengagements of frictional engagement elements (start clutch 3b and reverse brake 3c) of forward-reverse switching mechanism 3, and an engagement and a disengagement of lockup clutch 2d of torque converter 2.

Hydraulic pressure control unit 30 controls the hydraulic pressure (primary pressure Ppri) acted to primary pulley cylinder chamber 11c of primary pulley 11, and the hydraulic pressure (secondary pressure Psec) acted to secondary pulley cylinder chamber 12c, based on a command from CVT control unit 20.

In the belt type continuously variable transmission 10, the rotation inputted to primary pulley 11 is transmitted through V belt 13 to secondary pulley 12. When primary pulley 11 and secondary pulley 12 are rotated, movable conical disc 11a and movable conical disc 12a are moved back and forth (reciprocate) in a direction of a rotation shaft in accordance with the primary pressure and the secondary pressure.

When movable conical disc 11a and movable conical disc 12a are moved, pulley groove widths are varied, so that the V belt 13 is moved in the radial direction on primary pulley 11 and secondary pulley 12. With this, the contact radius of V belt 13 with respect to primary pulley 11 and secondary pulley 12 are continuously varied. The pulley ratio and the contact frictional force of V belt 13 are controlled to values determined in accordance with the primary pressure and the secondary pressure.

Moreover, hydraulic pressure control unit 30 controls a hydraulic pressure (Pc) supplied to forward-reverse switching mechanism, based on the command from CVT control unit 20 so as to engage and disengage the frictional engagement elements (start clutch 3b and reverse brake 3c).

CVT control unit 20 receives signals from engine control unit 21, an accelerator operation amount sensor 23, primary pulley rotational speed sensor 26, secondary pulley rotational speed sensor 27, and hydraulic pressure sensors 29a and 29b.

Engine control unit 21 outputs information of an input torque (torque information) inputted from engine 1 to belt type continuously variable transmission 10, to CVT control unit 20.

Accelerator operation amount sensor 23 outputs, to CVT control unit 20, a signal indicative of an operation amount (accelerator opening degree To) of an accelerator pedal (not shown), and a signal indicative of a variation rate (accelerator depression speed Tv) of the operation amount of the accelerator pedal.

A G sensor 24 is a sensor arranged to sense a gradient (inclination) of the vehicle. G sensor 24 outputs a signal indicative of an amount of the inclination of the vehicle with respect to a horizontal plane (surface), to CVT control unit 20.

Primary pulley rotational speed sensor 26 outputs a signal (Npri) indicative of the rotational speed of primary pulley 11, to CVT control unit 20.

Secondary pulley rotational speed sensor 27 outputs a signal (Nsec) indicative of the rotational speed of secondary pulley 12, to CVT control unit 20.

Besides, CVT control unit 20 calculates an actual pulley ratio (speed ratio), based on the signal (Npri) indicative of the rotational speed of primary pulley 11, and the signal (Nsec) indicative of the rotational speed of secondary pulley 12. Moreover, CVT control unit 20 identifies (specifies) the speed of the vehicle (vehicle speed) by the signal (Nsec) indicative of the rotational speed of secondary pulley 12.

Hydraulic pressure sensor 29a outputs a signal indicative of the hydraulic pressure (primary pressure Ppri) acted to primary pulley cylinder chamber 11c, to CVT control unit 20.

Hydraulic pressure sensor 29b outputs a signal indicative of the hydraulic pressure (secondary pressure Psec) acted to secondary pulley cylinder chamber 12c, to CVT control unit 20.

Figure 2:
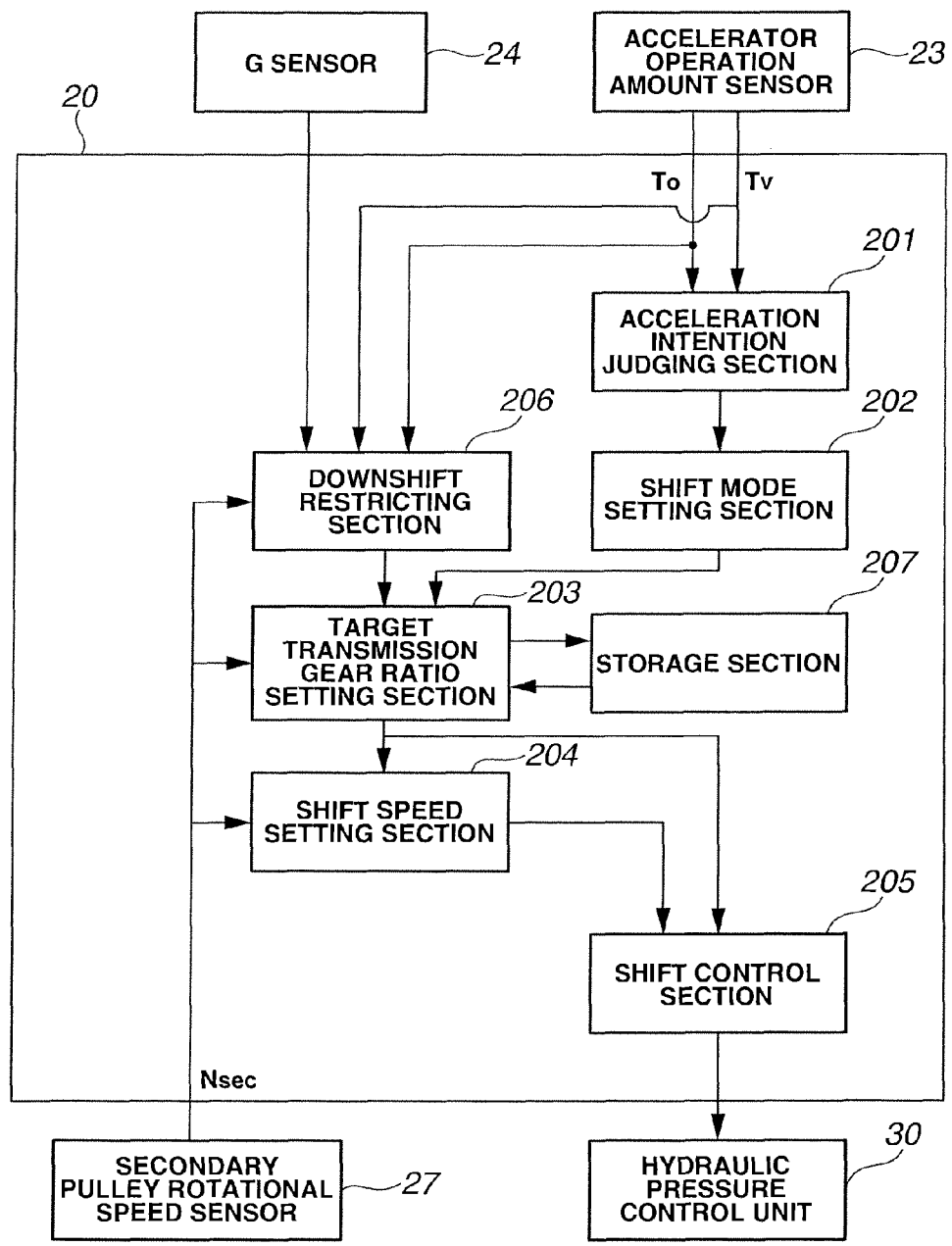
FIG. 2 is a block diagram showing a CVT control unit according to the one embodiment of the present invention.

FIG. 2 is a block diagram of CVT control unit 20.

As shown in FIG. 2, CVT control unit 20 includes an acceleration intention judging section 201, a shift mode setting section 202, a target transmission gear ratio setting section 203, a shift speed setting section 204, a shift speed control section 205, a downshift restricting section 206, a storage section 207.

Acceleration intention judging section 201 judges whether or not the driver has an acceleration intention, based on accelerator opening degree To and accelerator depression speed Tv.

In this embodiment, a map data (mode judgment map) which defines a relationship between accelerator opening degree To and acceleration depression speed Tv, and a normal mode and an acceleration mode is prepared at each vehicle speed V. Acceleration intention judging section 201 judges whether or not the driver has the acceleration intention with reference to (by referring to) the mode judgment map determined in accordance with the vehicle speed at the present time, based on accelerator opening degree To and accelerator depression speed Tv.

Besides, the mode judgment map is stored in storage section 207 of CVT control unit 20.

Shift mode setting section 202 is configured to set the shift mode of the continuously variable transmission. Shift mode setting section 202 is configured to set the shift control of the continuously variable transmission to the acceleration mode when acceleration intention judging section 201 judges that the driver has the acceleration intention, and to set the shift control of the continuously variable transmission to the normal mode when the acceleration intention judging section 201 judges that the driver does not have the acceleration intention.

Figure 3:
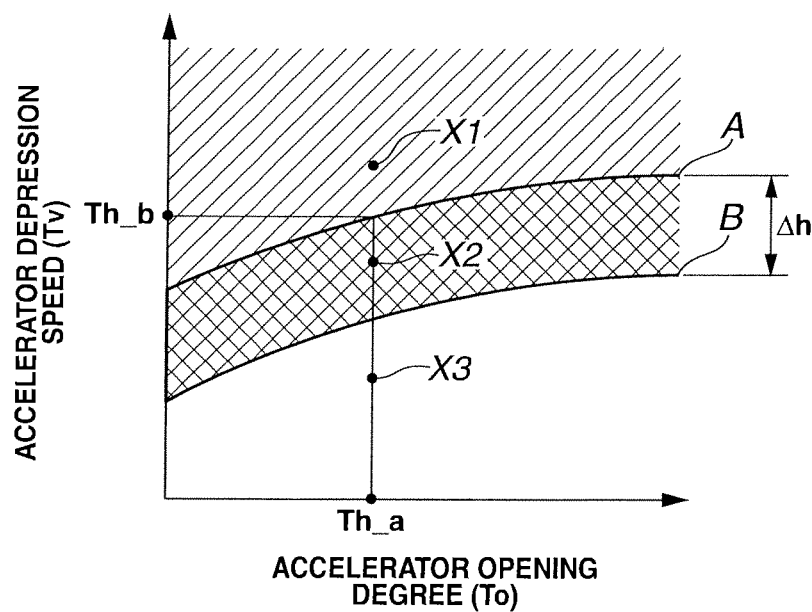
FIG. 3 is a view for illustrating one example of a mode judgment map.

FIG. 3 is a view for illustrating one example of a mode judgment map.

The mode judgment map shown in FIG. 3 defines a relationship between a threshold value for judging a transition from a normal mode to an acceleration mode and a threshold value for judging a transition from the acceleration mode to the normal mode, and accelerator opening degree To and accelerator depression speed Tv.

A symbol A in FIG. 3 is an acceleration mode transition judgment line connecting the threshold values for judging the transition from the normal mode to the acceleration mode. A symbol B in FIG. 3 is a normal mode transition judgment line connecting the threshold values for judging the transition from the acceleration mode to the normal mode.

For example, in case of the normal mode, when the accelerator opening degree To and the accelerator depression speed Tv at the present time are positioned at a position shown by a symbol X1 in FIG. 3, acceleration intention judging section 201 judges that the driver has the acceleration intention. Shift mode setting section 202 sets the shift control of the continuously variable transmission to the acceleration mode.

Moreover, in case of the normal mode, when the accelerator opening degree To and the accelerator depression speed Tv at the present time are positioned at a position shown by a symbol X2 in FIG. 3, acceleration intention judging section 201 judges that the driver does not have the acceleration intention. Shift mode setting section 202 sets the shift control of the continuously variable transmission to the normal mode, so that the normal mode is continued.

Furthermore, in case of the acceleration mode, when accelerator opening degree To and acceleration depression speed Tv at the present time are positioned at the position shown by symbol X2 in FIG. 3, shift mode setting section 202 continues the acceleration mode. Moreover, in case of the acceleration mode, when accelerator opening degree To and acceleration depression speed Tv at the present time are positioned at a position shown by a symbol X3 in FIG. 3, the acceleration mode is finished, and the normal mode is set.

Besides, in case of the acceleration mode, in this mode judging map, acceleration mode transition judgment line A and normal mode transition judgment line B are set to be separated from each other by Δh, for preventing generation of frequent switching between the acceleration mode and the normal mode.

Target transmission gear ratio setting section 203 sets the target rotational speed of the primary pulley with reference to (by referring to) a map (shift diagram) of the shift mode which is set at the present time, based on accelerator opening degree To and vehicle speed V. Target transmission gear ratio setting section 203 determines the target transmission gear ratio (the target pulley ratio) from the set target rotational speed of the primary pulley.

Besides, in this embodiment, when a downshift restricting section 206 judges that a restriction of the downshift is needed, target transmission gear ratio setting section 203 determines the target transmission gear ratio based on vehicle speed V and a pseudo accelerator opening degree inputted from downshift restricting section 206.

The pseudo accelerator opening degree in this case is not an actual accelerator opening degree (actual accelerator opening degree) sensed by accelerator operation amount sensor 23. It is pseudoly considered that the accelerator opening degree sensed at the previous time is held. Accordingly, the pseudo accelerator opening degree is the accelerator opening degree identical to the accelerator opening degree sensed at the previous time.

On the other hand, when downshift restricting section 206 judges that the restriction of the downshift is not needed, target transmission gear ratio setting section 203 determines the target transmission gear ratio based on the accelerator opening degree and vehicle speed V which are inputted through downshift restricting section 206.

Besides, the accelerator opening degree in this case is the actual accelerator opening degree (the actual accelerator opening degree) sensed by accelerator operation amount sensor 23.

In this embodiment, the actual accelerator opening degree is the accelerator opening degree at the present time, which is sensed by accelerator operation amount sensor 23. Accordingly, when the target transmission gear ratio is determined based on the actual accelerator opening degree, the shift of the continuously variable transmission is linearly performed in accordance with the accelerator operation.

Accordingly, when the accelerator opening degree is varied, the downshift and an upshift are performed in accordance with the accelerator opening degree.

On the other hand, the pseudo accelerator opening degree is the accelerator opening degree identical to the accelerator opening degree sensed at the previous time. Accordingly, when the pseudo accelerator opening degree is inputted, the control operation is performed by regarding the accelerator opening degree as being not varied. Consequently, in this case, the shift line used by the shift control is not switched. Therefore, the downshift and the upshift are not performed. The shift is performed based on the same shift line.

The shift diagrams to which the target transmission gear ratio setting section 203 is referred is stored in storage section 207. Storage section 207 stores the dedicated (special) shift diagram for each of the shift mode (the shift diagram for the normal mode, and the shift diagram for the acceleration mode).

Figure 4A:
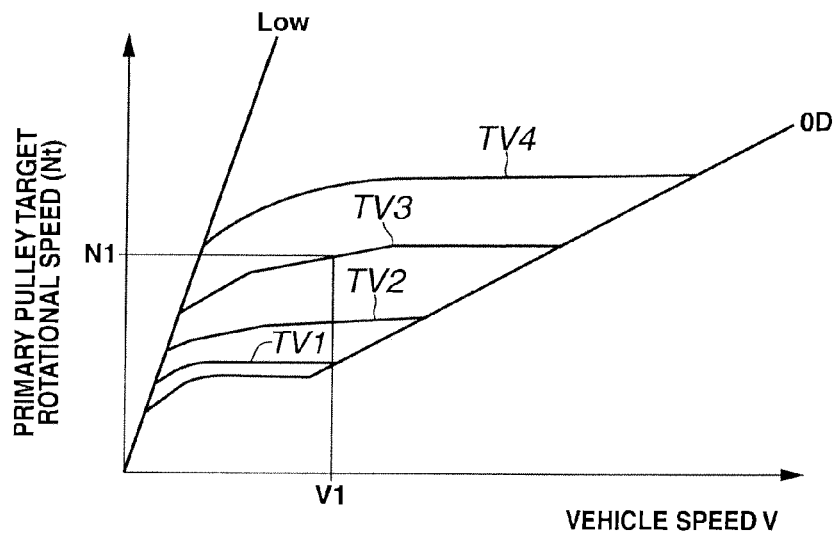
FIGS. 4A and 4B are views for illustrating a shift diagram.
Figure 4B:
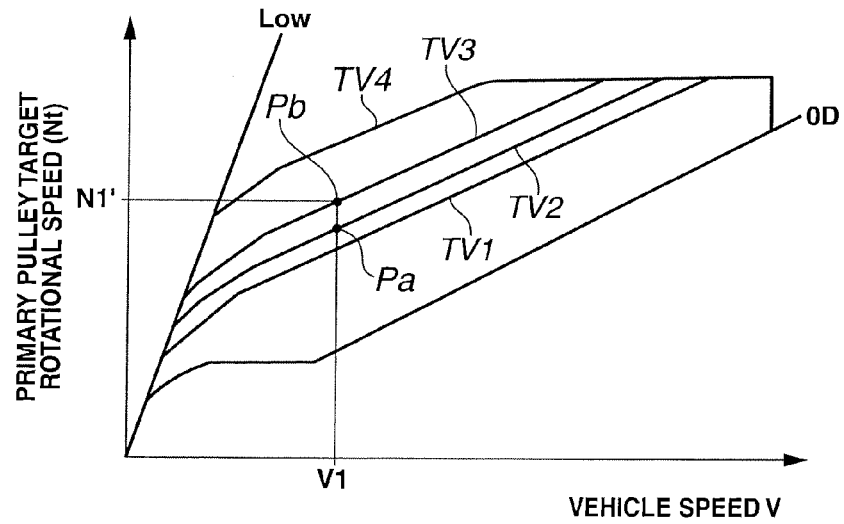

FIGS. 4A and 4B are views for illustrating the shift diagram. FIG. 4A is the shift diagram for the normal mode. FIG. 4B is the shift diagram for the acceleration mode.

In the shift diagram, a plurality of characteristic lines (TV1-TV4) corresponding to the accelerator opening degree which is increased or decreased in accordance with the depression amount of the accelerator pedal are set between a characteristic line Low in which the transmission gear ratio is maximized, and a characteristic line OD in which the transmission gear ratio is minimized. Target rotational speed Nt of the primary pulley is determined by referring to this shift diagram based on vehicle speed V and accelerator opening degree To.

In the shift diagram (cf. FIG. 4B) for the acceleration mode, target rotational speed Nt of the primary pulley is set to the higher rotation side than that of the shift diagram (cf. FIG. 4A) for the normal mode. In the downshift in the acceleration mode, target rotational speed Nt of the primary pulley becomes higher than that in the downshift in the normal mode, so that the torque inputted from the engine is set to become large.

For example, when the accelerator opening degree is TV3 and the vehicle speed is V1, target rotational speed N1' of the primary pulley which is determined from the shift diagram for the acceleration mode is set to become the higher rotation than target rotational speed N1 of the primary pulley which is determined from the shift diagram for the normal mode.

Accordingly, when it is judged that the driver has the acceleration intention at the vehicle speed V1 and the acceleration mode is set, at that time, the target rotational speed of the primary pulley is set based on the shift diagram for the acceleration mode. Consequently, the target rotational speed of the primary pulley becomes N1'. This target rotational speed N1' is a rotational speed higher than the target rotational speed N1 in the shift diagram of the normal mode. At the timing at which the acceleration mode is started, the downshift is started.

When target transmission gear ratio setting section 203 judges that the shift is performed, shift speed setting section 204 sets a time period (shift time period) during which the transmission gear ratio (actual transmission gear ratio) at the present time reaches the target transmission gear ratio, based on target transmission gear ratio Rt, vehicle speed V, transmission gear ratio (actual gear ratio) Rc at the present time.

Shift control section 205 outputs, to hydraulic pressure control unit 30, a command to vary the transmission gear ratio (the pulley ratio) at the present time toward the target transmission gear ratio (the pulley ratio) by the set shift speed, and controls the primary pulley and the secondary pulley to attain the target transmission gear ratio.

Downshift restricting section 206 calculates a road gradient (a gradient of the road) based on the output signal of G sensor 24. Moreover, downshift restricting section 206 calculates accelerator opening degree To and accelerator depression speed Tv based on the output signal of accelerator operation amount sensor 23.

Downshift restricting section 206 judges whether or not the restriction of the downshift is needed by referring to the shift restriction judgment map determined in accordance with the vehicle speed at the present time, based on the road gradient, the variation amount $\Delta$To of accelerator opening degree To, and acceleration depression speed Tv.

In this case, the shift restriction map is stored in storage section 207 of CVT control unit 20.

When it is judged that the restriction of the downshift is needed, downshift restricting section 206 outputs, to target transmission gear ratio setting section 203, the pseudo accelerator opening degree which is obtained by masking (taking no account of) the variation of accelerator opening degree To inputted to target transmission gear ratio setting section 203, for restricting (preventing) a new operation of the downshift.

In particular, it is pseudoly considered that the accelerator opening degree sensed at the previous time is held. Accordingly, downshift restricting section 206 outputs, to target transmission gear ratio setting section 203, the pseudo accelerator opening degree indicative of the accelerator opening degree identical to the accelerator opening degree at the previous time.

On the other hand, when it is judged that the restriction of the downshift is not needed, downshift restricting section 206 outputs, directly to target transmission gear ratio setting section 203, the accelerator opening degree (the actual accelerator opening degree) at the present time which is identified from the signal inputted from accelerator operation amount sensor 23.

Figure 5:
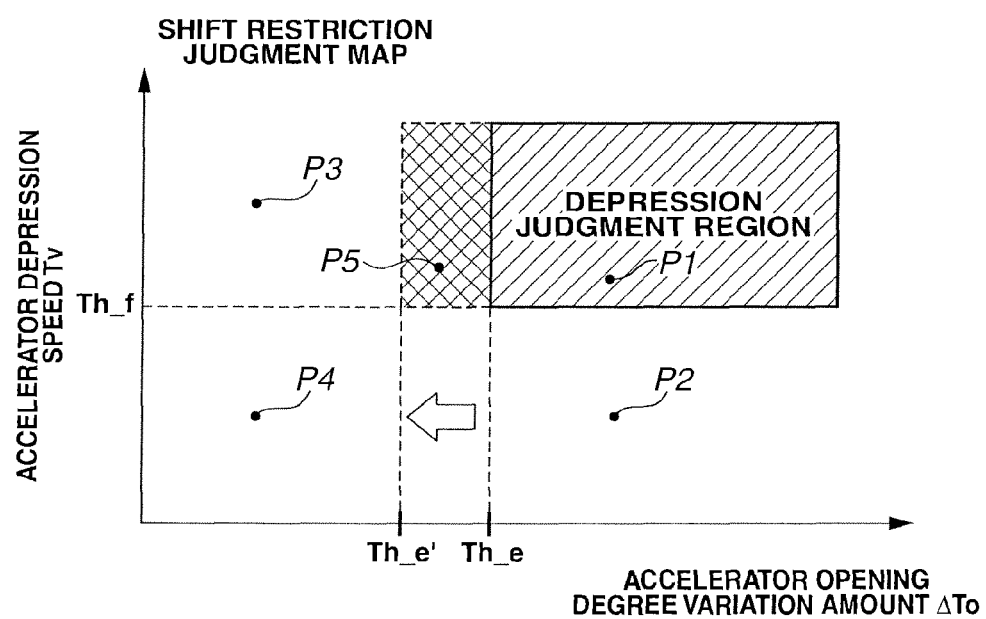
FIG. 5 is a view for illustrating a shift restriction judgment map.

FIG. 5 is a view for illustrating the shift restriction judgment map. The shift restriction judgment map shown in FIG. 5 defines a relationship between a predetermined value Th_e which is for a variation amount $\Delta$To of accelerator opening degree To (hereinafter, accelerator opening degree variation amount $\Delta$To), and which is a threshold value for judging whether or not the shift restriction is performed, and a predetermined value Th_f which is for accelerator depression speed Tv, and which is a threshold value for judging whether or not the shift restriction is performed.

In this embodiment, downshift restricting section 206 refers to the shift restriction judging map determined in accordance with the road gradient and the vehicle speed, based on accelerator opening degree variation amount $\Delta$To and accelerator depression speed Tv at the present time.

In this case, accelerator opening degree variation amount $\Delta$To is a difference between an accelerator opening degree To1 when the accelerator pedal is depressed (when the addition of the depression of the accelerator pedal is started), and an accelerator opening degree To2 at the present time (the accelerator opening degree after the addition of the depression) ($\Delta$To=To2−To1).

Then, (a) when accelerator opening degree variation amount $\Delta$To is equal to or greater than a predetermined value Th_e determined in accordance with the road gradient and the vehicle speed, and (b) when accelerator depression speed Tv is equal to or greater than a predetermined value Th_f determined in accordance with the vehicle speed, it is judged that the restriction of the downshift is not needed. When both of the above-described conditions (a) and (b) are not satisfied, it is judged that the restriction of the downshift is needed.

For example, in case of the shift restriction judgment map of FIG. 5, when accelerator opening degree variation amount $\Delta$To and accelerator depression speed Tv are positioned at a position shown by a symbol P1 in FIG. 5, both of the above-described conditions (a) and (b) are satisfied. Accordingly, it is judged that the restriction of the downshift is not needed.

Moreover, when accelerator opening degree variation amount $\Delta$To and accelerator depression speed Tv are positioned at a position shown by symbols P2, P3, or P4 in FIG. 5, at least one of the above described conditions (a) and (b) is not satisfied. Accordingly, it is judged that the restriction of the downshift is needed.

Besides, in this embodiment, the predetermined value Th_e for accelerator opening degree variation amount $\Delta$To is varied in accordance with the road gradient. When the vehicle runs on the uphill (upward slope), the predetermined value Th_e for accelerator opening degree variation amount ΔTo is varied to be smaller as the road gradient becomes larger (steeper).

For example, in this embodiment, in case of a road of a gradient X and a road of a gradient Y larger than the gradient X, predetermined value Th_e' for accelerator opening degree variation amount ΔTo which is set in the road of the gradient Y is set to be smaller than predetermined value Th_e for accelerator opening degree variation amount ΔTo which is set in the road of the gradient X (Th_e>Th_e').

In this embodiment, a difference between (Δ=Th_e−Th_e') is set to be larger as the road gradient becomes larger.

Accordingly, in a case where accelerator opening degree variation amount ΔTo and accelerator depression speed Tv are positioned at a position shown by a symbol P5 in FIG. 5, it is judged that the restriction of the downshift is not needed when the road gradient is large (predetermined value Th_e'), and it is judged that the restriction of the downshift is needed when the road gradient is not large (predetermined value Th_e).

Hereinafter, the operation in CVT control unit 20 in this embodiment is illustrated.

Figure 6:
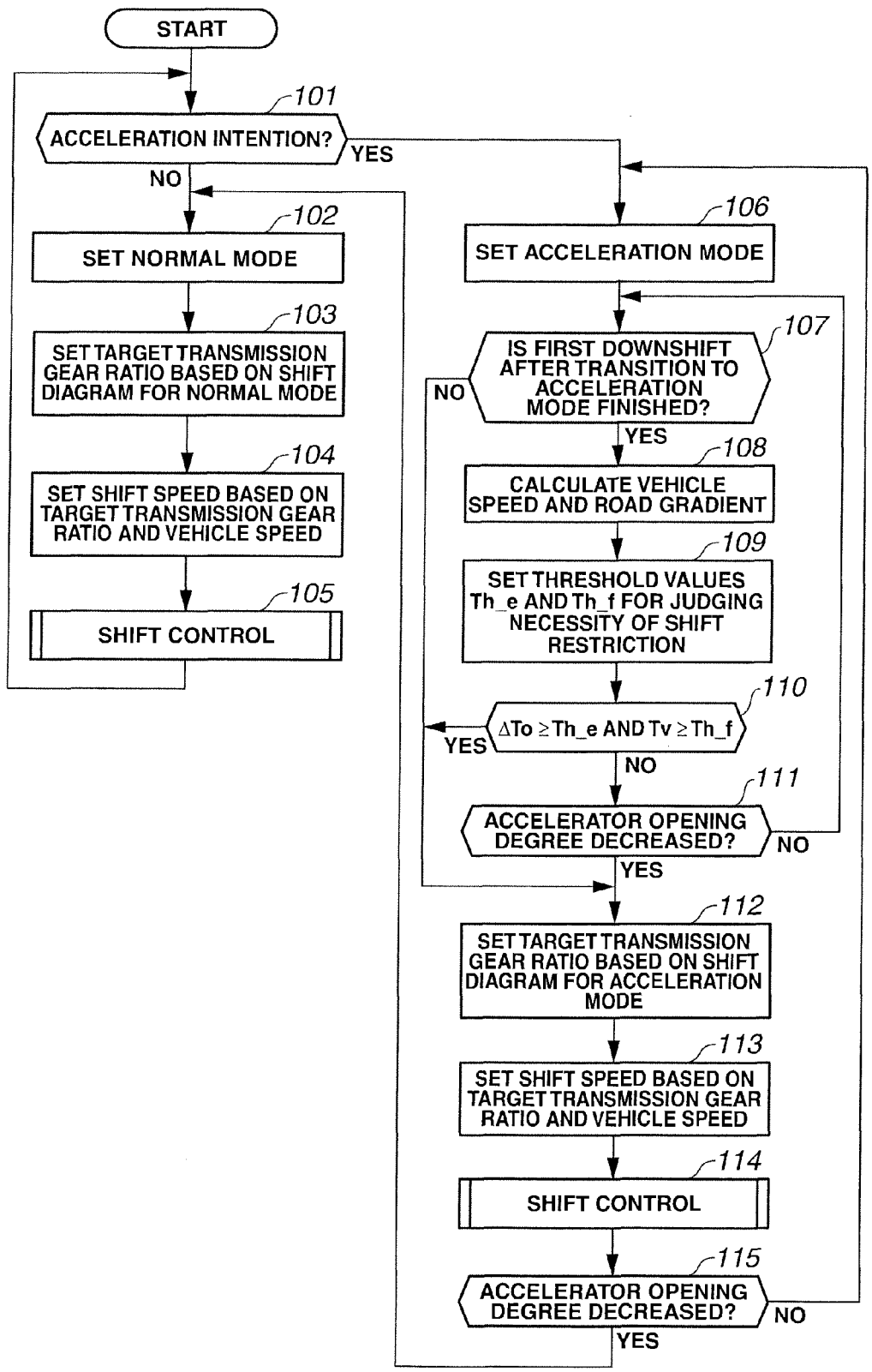
FIG. 6 is a flowchart for illustrating an operation in the CVT control unit.

FIG. 6 is a flowchart for illustrating the shift control operation performed in CVT control unit 20.

Besides, in below illustrations, the shift control operation other than portions relating to the main part according to the present invention is briefly illustrated.

In continuously variable transmission 10 according to the embodiment, there are prepared the normal mode and the acceleration mode for the shift control of the continuously variable transmission. In the acceleration mode, target rotational speed Nt of the primary pulley is set to the higher rotation side than that in the normal mode so as to attain the driving performance which has the priority in the acceleration performance.

In continuously variable transmission 10, the shift control of the continuously variable transmission is performed, in principle, in the normal mode. Then, when it is judged that the acceleration operation of the driver is the operation to require the acceleration of the vehicle, the acceleration mode is set. The shift control is performed in the acceleration mode.

Therefore, at step 101, it is judged whether or not the accelerator operation of the driver is the operation to require the acceleration of the vehicle, that is, whether or not the driver has the acceleration intention.

In particular, it is judged whether or not accelerator opening degree To at the present time is equal to or greater than a predetermined value Th_a, and whether or not accelerator depression speed Tv is equal to or greater than a predetermined value Th_b.

In this case, predetermined value Th_a is a value defined in the map with respect to vehicle speed V at the present time. Predetermined value Th_b is a value defined in the map with respect to the vehicle speed V at the present time, and accelerator opening degree To at the timing at which the accelerator pedal is depressed.

The depression amounts of the accelerator pedal (accelerator opening degrees To) at the high vehicle speed and at the low vehicle speed when the vehicle is accelerated are different from each other. Moreover, the depression speeds Tv of the accelerator pedal at that time are different from each other in accordance with the accelerator opening degree To at that time. Accordingly, in this embodiment, predetermined value Th_a is defined in the map with respect to vehicle speed V. Predetermined value Th_b is defined in the map with respect to vehicle speed V and accelerator opening degree To.

In general, when the driver has the acceleration intention, the accelerator pedal is depressed. Accordingly, at step 102, it is judged whether or not the driver has the acceleration intention based on a condition that accelerator opening degree To becomes equal to or greater than predetermined value Th_a (To≥Th_a), and a condition that accelerator depression speed Tv at that time becomes equal to or greater than predetermined value Th_b (Tv≥Th_b).

In this embodiment, in the above-described mode judgment map (cf. FIG. 3), the relationship between predetermined value Th_a of accelerator opening degree To and predetermined value Th_b of accelerator depression speed Tv is defined by acceleration mode transition judgment line A. When predetermined value Th_a of accelerator opening degree To is determined in accordance with vehicle speed, predetermined value Th_b of accelerator depression speed Tv is found (determined) from this mode judgment map.

Accordingly, for example, when accelerator opening degree To and accelerator depression speed Tv at the present time are positioned at the position shown by the symbol X1 in FIG. 3, the conditions of To≥Th_a and Tv≥Th_b are satisfied, and acceleration intention judging section 201 judges that the driver has the acceleration intention.

When the answer of step 101 is negative (NO) and it is judged that the driver does not have the acceleration intention, the process proceeds to step 102. At step 102, shift mode setting section 202 sets the shift control of continuously variable transmission 10 to the normal mode.

In this case, when the normal mode has been already set as the mode of the shift control, the normal mode is continuously set.

Subsequently to step 102, at step 103, target transmission gear ratio setting section 203 reads the shift diagram (cf. FIG. 4A) for the normal mode from storage section 207, and sets the parameters for the shift control based on the shift diagram for the normal mode.

In particular, target transmission gear ratio setting section 203 sets the target rotational speed of the primary pulley at the present time, and the target transmission gear ratio at the present time, with reference to the shift diagram for the normal mode based on vehicle speed V and accelerator opening degree To at the present time.

For example, in case of FIG. 4A, when vehicle speed V at the present time is V1 and accelerator opening degree To is TV3, the target rotational speed of the primary pulley is set to N1.

At step 104, shift speed setting section 204 sets the shift speed (a time period required for that the actual transmission gear ratio reaches the target transmission gear ratio), based on the transmission gear ratio (the actual transmission gear ratio) at the present time, the target transmission gear ratio set at step 104, and vehicle speed V at the present time.

Subsequently to step 104, at step 105, shift control section 204 determines the primary pressure and the secondary pressure, and outputs a command to attain the determined primary pressure and the determined secondary pressure, to hydraulic pressure control unit 30.

Accordingly, hydraulic pressure control unit 30 continuously varies the contact radii of V belt 13 with respect to primary pulley 11 and secondary pulley 12, so that the pulley ratio and the frictional force of V belt 13 are controlled to the values determined in accordance with the primary pressure and the secondary pressure.

With this, when the actual transmission gear ratio is continuously varied toward the target transmission gear ratio and the actual transmission gear ratio finally becomes equal to the target transmission gear ratio, the shift control at step 105 is finished.

After the operation of step 105 is finished, the process returns to the operation of step 101. At step 101, it is judged whether or not the driver has the acceleration intention, and the shift control according to the judgment result is performed.

On the other hand, when the answer of step 101 is affirmative (YES) and it is judged that the driver has the acceleration intention, the process proceeds to step 106. Shift mode setting section 202 sets the shift control of the continuously variable transmission to the acceleration mode.

In this case, when the normal mode has been already set as the mode of the shift control, the mode of the shift control is switched to the acceleration mode in which the target rotational speed of the primary pulley is set to the higher rotation side than that of the normal mode.

Subsequently to the setting of the acceleration mode at step 106, the process proceeds to step 107. At step 107, downshift restricting section 206 checks whether or not an initial (first) downshift after the transition to the acceleration mode is finished.

In particular, in the middle of the downshift, the actual transmission gear ratio of the continuously variable transmission is varying toward the target transmission gear ratio. When the downshift is finished, the actual transmission gear ratio becomes identical to the target transmission gear ratio.

Accordingly, at step 107, downshift restricting section 206 checks whether or not the actual transmission gear ratio is identical to the target transmission gear ratio. When the actual transmission gear ratio is identical to the target transmission gear ratio, downshift restricting section 206 judges that the downshift is finished. When the actual transmission gear ratio is not identical to the target transmission gear ratio, downshift restricting section 206 judges that the downshift is not finished.

When downshift restricting section 206 judges at step 107 that the initial downshift is not finished at step 107, the process proceeds to step 111 described later. When downshift restricting section 206 judges at step 107 that the initial downshift is finished, the process proceeds to step 108.

The driver has the acceleration intention (the intention of the downshift) at a timing at which (when) the shift mode is transited to the acceleration mode. In this case, if the downshift is restricted, it is against (contrary to) the acceleration intention of the driver. Accordingly, it is judged whether or not the initial downshift is finished at step 107.

At step 108, downshift restricting section 206 calculates the road gradient based on the output signal of G sensor 24. Moreover, downshift restricting section 206 calculates the vehicle speed at the present time based on the output signal of secondary pulley rotational speed sensor 27.

Subsequently to step 108, the process proceeds to step 109. At step 109, downshift restricting section 206 sets the threshold values (predetermined value Th_e for the variation amount of the accelerator opening degree, and predetermined value Th_f for the acceleration depression speed) for judging whether or not the restriction of the downshift is needed.

In this embodiment, the map (the shift restriction judgment map) for judging the restriction of the downshift is prepared for the each driving state. These plurality of the shift restriction judgment maps are stored in storage section 207.

Accordingly, downshift restricting section 206 reads, from storage section 207, the one shift restriction judgment map determined in accordance with the road gradient and the vehicle speed which are calculated at step 108. Downshift restricting section 206 sets, as the threshold values for judging whether or not the restriction of the shift is needed, predetermined value Th_e for the variation of the accelerator opening degree, and predetermined value Th_f for the accelerator depression speed which are defined in this read shift restriction judgment map.

At step 110, it is judged whether or not the restriction of the downshift is needed with reference to the shift restriction judgment map, based on accelerator opening degree variation amount ΔTo and accelerator depression speed Tv.

In particular, (a) when accelerator opening degree variation amount ΔTo is equal to or greater than predetermined value Th_e determined in accordance with the road gradient and the vehicle speed, and (b) when accelerator depression speed Tv is equal to or greater than predetermined value Th_f determined in accordance with the vehicle speed, it is judged that the restriction of the downshift is not needed. When the both of the conditions (a) and (b) are not satisfied, it is judged that the restriction of the downshift is needed.

Subsequently to the judgment that the restriction of the downshift is needed at step 110, at step 111, it is checked whether or not the accelerator opening degree is decreased. When it is judged that the accelerator opening degree is not decreased at step 111 (the answer of step 111 is negative (NO)), the process proceeds to step 107.

With this, the operations from step 107 to step 110 are repeated as long as the accelerator opening degree is not decreased (the answer of step 111 is negative (NO)), until it is judged that the restriction of the downshift is not needed at step 110, that is, until the accelerator operation is performed to satisfy the condition of To≥Th_e and the condition of Tv≥Th_f.

During the above-described time period, the variation of the accelerator opening degree is masked. It is pseudoly considered that the accelerator opening degree is not varied, although the accelerator opening degree is varied. Accordingly, the new downshift is not performed.

When it is judged that the restriction of the downshift is not needed at step 110, when it is judged that the accelerator opening degree is decreased at step 111, or when the answer of step 107 is negative (NO), at step 112, target transmission gear ratio setting section 203 reads the shift diagram (cf. FIG. 4B) for the acceleration mode from storage section 207, and sets the parameters for the shift control based on the shift diagram for the acceleration mode.

In particular, target transmission gear ratio setting section 203 sets the target rotational speed of the primary pulley and the target transmission gear ratio at the present time with reference to the shift diagram for the acceleration mode based on vehicle speed V and accelerator opening degree To (the actual accelerator opening degree) at the present time.

FIG. 4B shows, as one example, a case in which the accelerator opening degree at the present time is varied from the accelerator opening degree at the previous time, the shift line determined in accordance with the accelerator opening degree is switched from TV2 to TV3, and vehicle speed V at the present time is V1.

In this case, by switching the shift lines, the target rotational speed of the primary pulley at vehicle speed V1 is shifted to the high rotation side (shifted from point Pa to point Pb in FIG. 4B). Consequently, the target rotational speed N1' of the primary pulley is set. Accordingly, the target transmission gear ratio is varied, so that the downshift is started.

At step 113, shift speed setting section 204 sets the shift speed (time period necessary that the actual transmission gear ratio reaches the target transmission gear ratio), based on the transmission gear ratio (the actual transmission gear ratio) at the present time, the target transmission gear ratio set at step 112, and vehicle speed V at the present time.

Subsequently to step 113, the process proceeds to step 114. At step 114, shift control section 205 determines the primary pressure and the secondary pressure, and outputs, to hydraulic pressure control unit 30, a command to attain the determined primary pressure and the determined secondary pressure.

Accordingly, the contact radii of V belt with respect to primary pulley 11 and secondary pulley 12 are continuously varied by hydraulic pressure control unit 30. Consequently, the pulley ratio and the contact frictional force of V belt 13 are controlled to values determined in accordance with the primary pressure and the secondary pressure.

With this, the actual transmission gear ratio is continuously varied toward the target transmission gear ratio. The shift control at step 114 is finished at a timing at which the actual transmission gear ratio finally reaches (becomes equal to) the target transmission gear ratio.

Subsequently to the end of the operation at step 114, the process proceeds to step 115. At step 115, it is judged whether or not accelerator opening degree To is decreased.

In particular, it is judged that accelerator opening degree To is decreased when accelerator opening degree To at the present time is smaller than a predetermined value Th_d (To<Th_d).

In this case, predetermined value Th_d is a value defined with respect to the vehicle speed at the present time, and accelerator opening degree To at a timing at which it is judged that the driver has the acceleration intention (at the timing of the depression of the accelerator pedal). These relationship is defined in the mode judgment map. Moreover, these satisfy Th_d<Th_a.

In a case where it is judged that accelerator opening degree To is decreased at step 115, the driver returns the accelerator pedal. Accordingly, the driver does not have the acceleration intention. Therefore, the process returns to the operation of step 102. The normal mode is set.

On the other hand, when the answer of step 115 is negative (NO), the driver continues to depress the accelerator pedal. In this case, the process returns to the operation of step 106 for continuously performing the shift control of the acceleration mode.

Figure 7A:
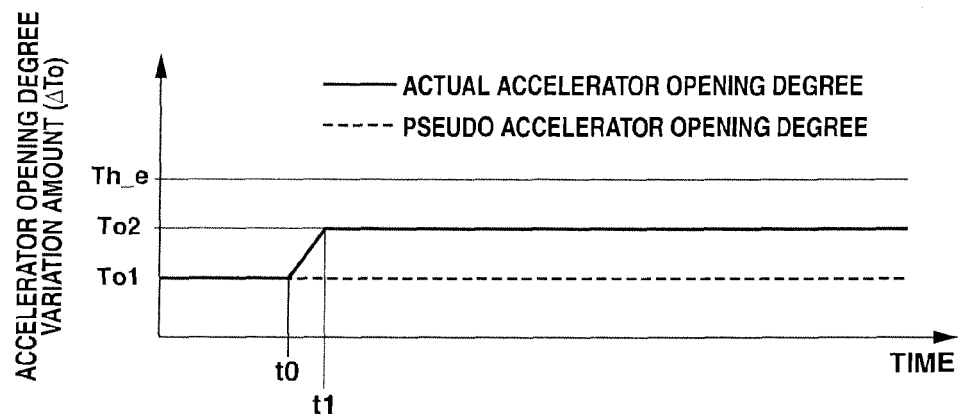
FIGS. 7A and 7B are time charts for illustrating the operation in the CVT control unit.
Figure 7B:
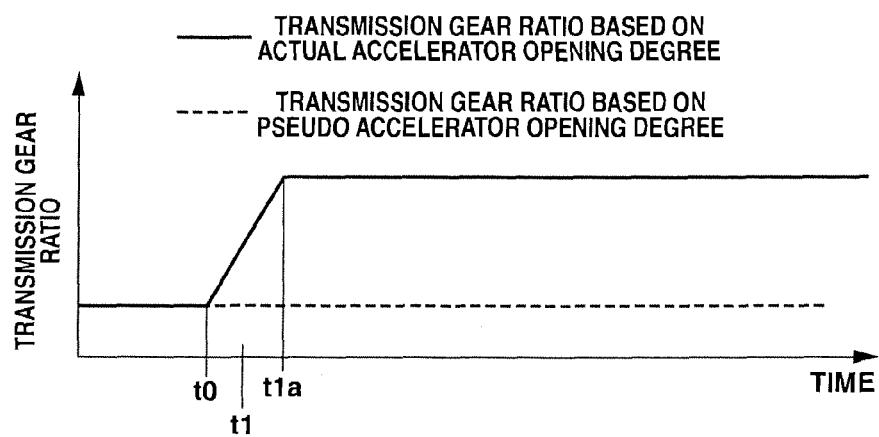

FIGS. 7A and 7B are time charts for illustrating the variation of the transmission gear ratio according to the acceleration operation of the driver. FIG. 7A shows a case where the accelerator opening degree is slightly increased and then held after the end of the initial (first) downshift after the transition to the acceleration mode. FIG. 7b shows a variation of the transmission gear ratio in case of FIG. 7A.

Besides, in below illustrations of one example, it is presumed that the condition of the acceleration depression speed Tv is satisfied when it is judged whether or not the downshift is needed.

When the initial (first) downshift after the transition to the acceleration mode is finished, the judgment of step 107 is affirmed, the vehicle speed and the road gradient are calculated (step 108), and the predetermined values Th_e and Th_f for judging whether or not the restriction of the shift is needed are set (step 109).

While acceleration opening degree variation amount ΔTo and acceleration depression speed Tv do not satisfy the conditions of step 110, it is judged that the restriction of the downshift is needed. The operations from step 107 to step 110 are repeated as long as the opening degree is not decreased (the answer of step 111 is (negative (No)).

Accordingly, while the operations from step 107 to step 110 are repeated, the pseudo accelerator opening degree is inputted to target transmission gear ratio setting section 203.

For example, even when the accelerator opening degree is varied from accelerator opening degree To1 to accelerator opening degree To2 as shown by a solid line in FIG. 7A, accelerator opening degree variation amount ΔTo (=To2−To1) in this case is smaller than predetermined value Th_e for judging whether or not the restriction of the downshift is needed. Accordingly, in this case, the answer of step 110 is negative (No), it is judged that the restriction of the downshift is needed.

Consequently, the variation of the accelerator opening degree is masked, it is pseudoly considered that the accelerator opening degree is not varied. That is, while it is judged that the restriction of the downshift is needed, it is pseudoly considered that the accelerator opening degree is not varied, as shown by a broken line in FIG. 7A (after time t0).

In this case, the shift line is not switched. Accordingly, the downshift is not performed.

When the actual accelerator opening degree is held to the constant value as in case of FIG. 7A (after time t1), the target transmission gear ratio set by target transmission gear ratio setting section 203 is held to be not varied under the condition that the vehicle speed is held to the substantially constant value (cf. a broken line in FIG. 7B).

On the other hand, when the accelerator opening degree is not masked, the downshift is started to follow (in response to) the depression operation of the accelerator. However, when the accelerator opening degree is masked as shown by a solid line of FIG. 7B, the downshift is not started to follow (in response to) the depression operation of the accelerator. Consequently, the transmission gear ratio is held to the substantially constant value.

Figure 8A:
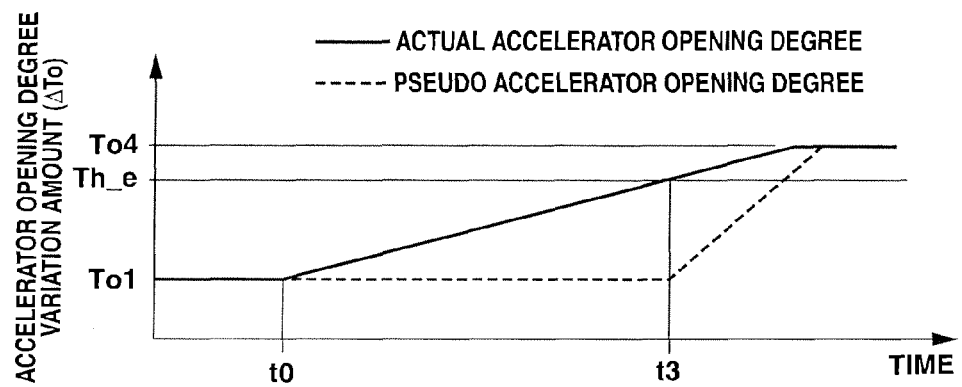
FIGS. 8A and 8B are time charts for illustrating the operation in the CVT control unit.
Figure 8B:
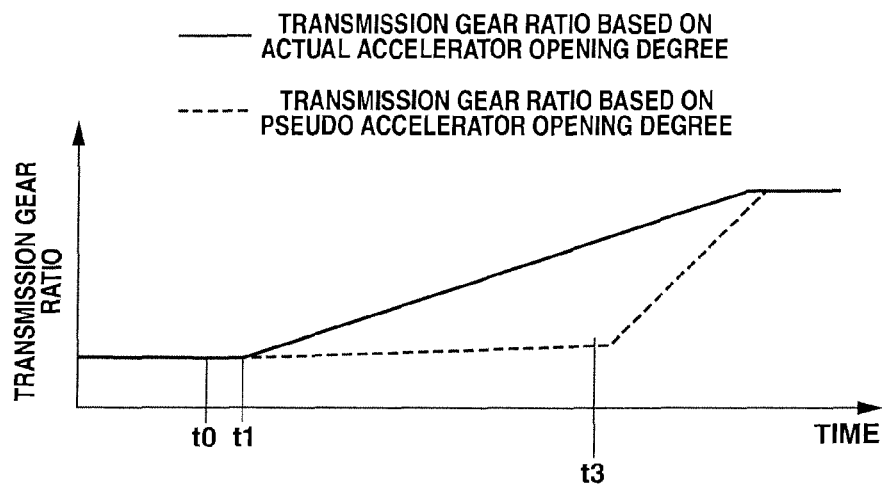

FIGS. 8A and 8B are time charts for illustrating the variation of the transmission gear ratio according to the acceleration operation of the driver. FIG. 8A shows a case where the accelerator opening degree continues to be increased at a predetermined ratio after the end of the initial (first) downshift after the transition to the acceleration mode. FIG. 8B shows the variation of the transmission gear ratio in case of FIG. 8A.

Besides, in below illustrations of one example, it is presumed that the condition of the acceleration depression speed Tv is satisfied when it is judged whether or not the downshift is needed, like the case of FIGS. 7A and 7B.

When the accelerator opening degree is varied as shown in a solid line of FIG. 8A after the initial (first) downshift after the acceleration mode is finished, it is judged that the restriction of the downshift is needed while accelerator opening degree To and accelerator depression speed Tv do not satisfy the conditions of step 110 (from time t0 to time t3). The process repeats the operations from step 107 to step 110.

Consequently, while the process repeats the operations from step 107 to step 110, target transmission gear ratio setting section 203 receives the pseudo accelerator opening degree shown by a broken line in FIG. 8A.

In this case, the variation of the accelerator opening degree is masked, it is pseudoly considered that the accelerator opening degree is not varied. Accordingly, the downshift is not started.

Accordingly, the vehicle speed is varied in accordance with the engine torque while the variation of the downshift is masked. Consequently, the transmission gear ratio is set based on the shift diagram determined in accordance with the this varying vehicle speed, and the masked accelerator opening degree. Therefore, the transmission gear ratio is slightly increased (time t1-time t3).

Then, when accelerator opening degree variation amount ΔTo exceeds (becomes greater than) predetermined value Th_e at time t3 and the answer of step 110 is affirmative (YES), it is judged that the restriction of the downshift is not needed at that time. In this case, if the target transmission gear ratio is set based on the actual accelerator opening degree in place of the pseudo accelerator opening degree, the transmission gear ratio may be suddenly varied.

In this way, it is judged whether or not the restriction of the downshift is needed in accordance with the accelerator opening degree variation amount and the accelerator depression speed of the driver. While it is judged that the restriction of the downshift is needed, the variation of the accelerator opening degree is masked, it is pseudoly considered that the accelerator opening degree is not varied.

Accordingly, while it is judged that the restriction of the downshift is needed, the new downshift is not started. Therefore, it is possible to prevent from performing the shift in the linear manner in response to the slight accelerator operation of the driver.

As mentioned above, a shift control apparatus (CVT control unit 20) of a continuously variable transmission 10 arranged to continuously vary a rotational driving force of an engine which is inputted to a primary pulley 11, and to transmit the varied rotational driving force to a secondary pulley 12, CVT control unit 20 includes a target transmission gear ratio setting section 203 configured to set a target transmission gear ratio by referring to (with reference to) a map based on an accelerator opening degree and a vehicle speed; a shift speed setting section 204 configured to set a shift speed based on the target transmission gear ratio and the vehicle speed; a shift control section 205 configured to control a shift of the continuously variable transmission based on the target transmission gear ratio and the shift speed; and a downshift restricting section 206 configured to judge whether or not a restriction of a downshift is needed based on at least one of an accelerator opening degree variation amount and an accelerator depression speed, to mask (taken no account of) a variation of the accelerator opening degree (the accelerator opening degree variation amount) which is inputted to target transmission gear ratio setting section 203 when it is judged that the restriction of the downshift is needed, and thereby to restrict the downshift.

By the thus-constructed control apparatus, the variation of the accelerator opening degree is masked while it is judged that the restriction of the downshift is needed. Consequently, it is pseudoly considered that the accelerator opening degree is not varied.

Accordingly, while it is judged that the restriction of the downshift is needed, the new downshift is not started. Consequently, it is possible to prevent from performing the shift in the linear manner in response to the slight accelerator operation of the driver, and thereby to prevent the engine speed from largely increasing. With this, it is possible to preferably suppress that the driver get a feeling that the variation of the engine speed is noisy. Accordingly, it is possible to suppress the unnatural feeling of the driver with respect to the driving feeling.

Moreover, while the downshift is restricted, the continuously variable transmission is controlled without switching the shift line used for setting the target transmission gear ratio.

In this case, the driver feels the driving feeling (the ride quality) to accelerate the vehicle or to decelerate the vehicle, only by the variation of the torque of the engine. Consequently, it is possible to pseudoly attain the driving feeling (the ride quality) near the stepped AT (the stepwise automatic transmission). Therefore, it is possible to provide the driving feeling without the unnatural feeling, to the driver who likes the driving feeling of stepped AT.

CVT control unit 20 further includes an acceleration intention judging section 201 configured to judge an acceleration intention of the driver (whether or not the driver has the acceleration intention); a shift mode setting section 202 configured to set the shift control of continuously variable transmission 10 to an acceleration mode in which the target rotational speed of primary pulley 11 is set to a higher rotation side than that of a normal mode; target transmission gear ratio setting section 203 is configured to set the target transmission gear ratio by referring to (with reference to) a map prepared at each shift mode based on the accelerator opening degree and the vehicle speed; and downshift restricting section 206 is configured to judge whether or not the restriction of the downshift is needed after an initial (first) downshift in the acceleration mode is finished.

At a timing at which the mode is shifted to the acceleration mode, the driver has the acceleration intention (the intention of the downshift). Accordingly, if the downshift is restricted in this case, it is contrary to the acceleration intention of the driver. Consequently, the driver may feel the unnatural feeling to the driving feeling.

Therefore, it is judged whether or not the restriction of the downshift is needed after the initial downshift after the transition to the acceleration mode is finished. With this, it is possible to suppress the unnatural feeling of the driver to the driving feeling.

Downshift restricting section 206 judges that the restriction of the downshift is not needed when accelerator opening degree variation amount ΔTo and accelerator depression speed Tv, and predetermined values Th_e and Th_f which are determined in accordance with the vehicle speed satisfy ΔTo≥Th_e and Tv≥Th_f. Downshift restricting section 206 judges that the restriction of the downshift is needed when accelerator opening degree variation amount ΔTo and accelerator depression speed Tv, and predetermined values Th_e and Th_f do not satisfy ΔTo≥Th_e and Tv≥Th_f.

By the thus-constructed control apparatus, the predetermined values are varied in accordance with the vehicle speed. Accordingly, it is appropriately judged whether or not the restriction of the downshift is needed, in the wide range from the low vehicle speed to the high vehicle speed.

The predetermined value Th_e for the variation of the accelerator opening degree (the accelerator opening degree variation) which is determined in accordance with the vehicle speed is varied in accordance with the road gradient. The predetermined value Th_e becomes smaller (the accelerator opening degree becomes smaller) as the road gradient becomes greater (steeper) when the vehicle runs the uphill.

By the thus-constructed control apparatus, when the road gradient is steeper when the vehicle runs the uphill, the predetermined value Th_e becomes smaller. Accordingly, it is hard to restrict the downshift. Consequently, it is possible to preferably prevent the restriction of the downshift, in a driving state in which the downshift is needed for running the uphill.

With this, the downshift is more linearly performed with respect to the accelerator operation of the driver as the road gradient is steeper. Accordingly, it is possible to suppress that the driver has the unnatural feeling to the driving feeling when the vehicle runs the uphill.

In the above-described embodiment, downshift restricting section 206 judges whether or not the restriction of the downshift is needed by comparing both of accelerator opening degree variation amount ΔTo and accelerator depression speed Tv, and the respective predetermined values (threshold values). However, t may be judged whether or not the restriction of the downshift is needed by comparing one of accelerator opening degree variation amount ΔTo and accelerator depression speed Tv, and the respective predetermined values (threshold values).

For example, even when the driver does not have the intention of the operation of the accelerator pedal and the driver drives to hold the accelerator opening degree to the constant value, the accelerator opening degree is repeated to slightly increase and decrease. In the variation of the accelerator opening degree when the driver does not have the intention, the accelerator depression speed (the accelerator opening speed) becomes remarkably slow relative to a case where the driver performs the acceleration operation with the intention.

Accordingly, downshift restricting section 206 restricts the downshift it is satisfied that the accelerator depression speed Tv is greater than the threshold value determined in accordance with the vehicle speed (Tv≥Th_f). With this, the driver's unintended variation of the accelerator opening degree is masked (taken no account). Consequently, it is possible to preferably prevent the engine speed from increasing by starting the downshift, irrespective of the no intention of the driver. Therefore, it is possible to preferably prevent the unnatural feeling of the driver with respect to the driving feeling.

In this way, downshift restricting section 206 is configured to judge whether or not the restriction of the downshift is needed by comparing at least one of accelerator opening degree variation amount ΔTo and accelerator depression speed Tv, and the respective threshold values which are determined in accordance with the vehicle speed. With this, it is possible to prevent the unnatural feeling of the driver with respect to the driving feeling.

In particular, downshift restricting section 206 is configured to restrict the downshift when the accelerator depression speed Tv is greater than the threshold value determined in accordance with the vehicle speed (Tv≥Th_f). Accordingly, it is possible to mask the variation of the accelerator opening degree that the driver does not intend. Moreover, it is possible to preferably prevent the increase of the engine speed due to starting the downshift irrespective of no intention of the driver. Accordingly, it is possible to preferably prevent the unnatural feeling of the driver with respect to the driving feeling.

Moreover, in the above-described embodiment, the predetermined value Th_e for the variation amount of the accelerator opening degree is varied in accordance with the road gradient. However, the predetermined value Th_e for the variation amount of the accelerator opening degree may be set by considering a sport driving degree of the driver of the vehicle.

For example, the accelerator operation of the driver is monitored with time so as to obtain the inclination (tendency) of the accelerator operation of the driver. When the driver has high inclination of the acceleration of the vehicle (when the sport driving degree is high), it is preferable that the predetermined value Th_e for the variation of the accelerator opening degree is set smaller relative to a case where the sport driving degree of the driver is not high.

In this case, the restriction of the downshift is hard to be performed. The downshift is linearly performed with respect to the acceleration operation. Accordingly, it is possible to provide the shift behavior according to the driving feeling of the driver who has the high sport driving degree.

In the above-described embodiment, the road gradient is calculated based on the output signal of G sensor 24. However, for example, the road gradient may be calculated from the engine torque, the vehicle speed, and the acceleration. In this case, the road gradient can be calculated regardless of G sensor 24. Accordingly, it is possible to decrease the manufacturing cost of the shift control apparatus of the continuously variable transmission.

The above-described embodiment exemplifies the control apparatus for the continuously variable transmission provided with the shift diagrams for the normal mode and the acceleration mode. Moreover, the present invention is applicable to a control apparatus for a continuously variable transmission having a driving mode (for example, snow mode) which uses a shift diagram in which a shift line suited for a snowy road.

For example, the variation of the accelerator opening degree is masked when the vehicle runs on the snowy road. With this, it is possible to prevent the linear shift with respect to the variation of the accelerator opening degree. Consequently, it is possible to attain the stable running on the snowy road.

In the above-described embodiment, shift speed setting section 204 sets a time period (shift time period) during which the transmission gear ratio (the actual transmission gear ratio) at the present time reaches the target transmission gear ratio, based on target transmission gear ratio Rt, vehicle speed V, transmission gear ratio (the actual transmission gear ratio) Rc at the present time. However, shift speed setting section 204 may be omitted, and a predetermined time period which is previously set is uniformly set as the shift time period.

Furthermore, in this embodiment, the continuously variable transmission is the belt type continuously variable transmission. However, the present invention is applicable to a troidal continuously variable transmission.

The entire contents of Japanese Patent Application No. 2011-282702 filed Dec. 26, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift control apparatus for a continuously variable transmission of a vehicle which is arranged to continuously vary a rotational driving force of an engine which is inputted to an input side rotation member, and to transmit the varied rotational driving force to an output side rotation member, the shift control apparatus comprising:
   a target transmission gear ratio setting section configured to set a target transmission gear ratio with reference to a map based on an accelerator opening degree and a vehicle speed;
   a shift control section configured to control a shift of the continuously variable transmission based on the target transmission gear ratio; and
   a downshift restricting section configured to judge whether or not a restriction of the downshift is needed based on at least one of a variation amount of the accelerator opening degree and an accelerator depression speed, and to perform the restriction of the downshift when the downshift restricting section judges that the restriction of the downshift is needed, irrespective of a variation of the accelerator opening degree inputted to the target transmission gear ratio setting section.

2. The shift control apparatus as claimed in claim 1, wherein the shift control apparatus further comprises an acceleration intention judging section configured to judge whether or not the driver has an acceleration intention, and a shift mode setting section configured to set a shift control of the continuously variable transmission to an acceleration mode in which a target rotational speed of the input side rotation member is set to a higher rotation speed than the target rotational speed in a normal mode; and the downshift restricting section is configured to judge whether or not the restriction of the downshift is needed after an initial downshift in the acceleration mode is finished.

3. The shift control apparatus as claimed in claim 1, wherein the downshift restricting section is configured to judge that the restriction of the downshift is needed when at least one of the variation amount of the accelerator opening degree and the accelerator depression speed is smaller than each threshold value determined in accordance with the vehicle speed.

4. The shift control apparatus as claimed in claim 1, wherein the downshift restricting section is configured to judge that the restriction of the downshift is needed when both of the variation amount of the accelerator opening degree and the accelerator depression speed is smaller than respective threshold values determined in accordance with the vehicle speed.

5. The shift control apparatus as claimed in claim 3, wherein the threshold value is set to a smaller value as a road gradient is larger, relative to a case where the road gradient is small.

\* \* \* \* \*